April 11, 1939.     C. A. SWANSTROM     2,153,681
FASTENING MEANS AND METHOD OF MANUFACTURE THEREOF
Filed May 28, 1936
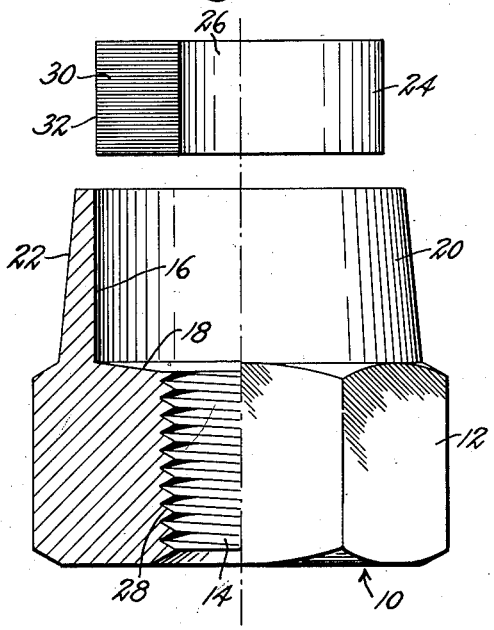
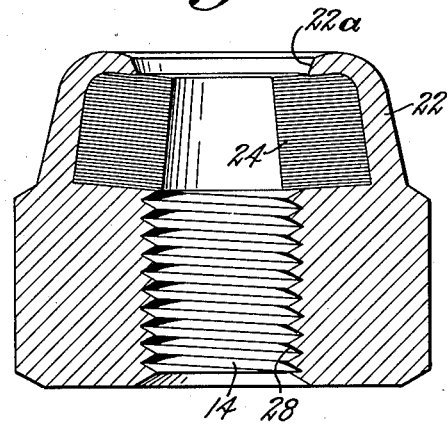
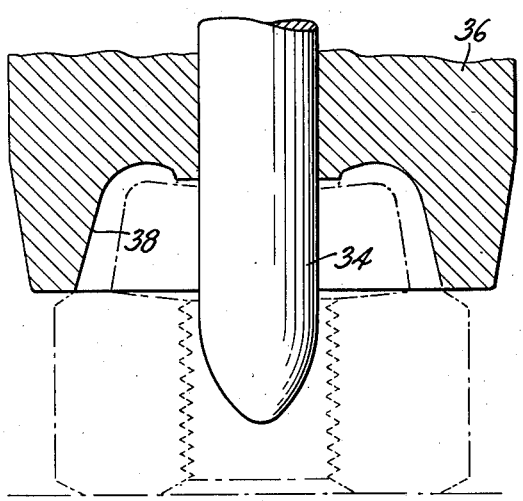
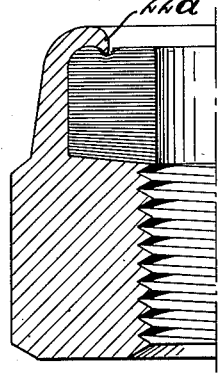
PRIOR ART
INVENTOR.
Carl A. Swanstrom
BY
his ATTORNEY.

UNITED STATES PATENT OFFICE 2,153,681

FASTENING MEANS AND METHOD OF MANUFACTURE THEREOF

Carl A. Swanstrom, Irvington, N. J., assignor to Elastic Stop Nut Corporation, Elizabeth, N. J., a corporation of New Jersey Application May 28, 1936, Serial No. 82,170

10 Claims. (Cl. 151—7)

The present invention relates to the manufacture of self-locking nuts and self-locking nut products and has particular reference to self-locking nuts of the kind ordinarily referred to as stop nuts. More particularly it relates to elastic stop nuts, the characteristic feature of which is the fixing within the nut body of a non-metallic unthreaded insert or washer having a bore the diameter of which is less than the maximum diameter of the thread of the bolt or screw upon which the nut is intended to be threaded, and registering with a threaded bore in the nut body.

In one of its aspects the invention may be considered as an improvement upon elastic stop nuts of the kind disclosed in U. S. Patent No. 1,550,282 granted to T. G. Rennerfelt. In another of its aspects it may be considered as an improvement upon elastic stop nuts and the manufacture thereof disclosed in my United States Patent No. 2,070,032, granted February 9, 1937.

In order for elastic stop nuts of the character under consideration to function properly, it is essential that the non-metallic insert be rigidly retained within the nut body so that there is no possibility of turning of the insert relative to the nut body, and for a successful commercial product the fixing of the insert in the nut body must be absolutely reliable so that there is substantially no possibility of permitting any nut to go into service in which the insert may, during the life of the nut, become loosened to an extent permitting it to turn within the nut body.

In order to insure the rigid fixing of the inserts in the nut bodies, various means have heretofore been suggested for retaining the inserts, such as keys, indentations and the like. It has also been proposed to hold symmetrical circular inserts of washer form by deforming or crimping a portion of the nut body forming the wall of the recess in which the insert is placed, over the top of the washer in a manner such that the washer is tightly gripped between the crimped portion and the bottom of the recess by pressure exerted axially of the bore of the nut.

The methods of fixing the inserts heretofore employed have produced results which are satisfactory to a certain extent, but all of the methods heretofore used have certain disadvantages of one kind or another which it is the general object of the present invention to eliminate. Thus the keying, or fixing of the inserts by means similar to keying, involves additional steps of manufacture which increase the cost of the product, and it is essential for products of the kind to which the invention relates that the cost be kept as low as possible.

The securing of the inserts by pressure exerted axially of the bore of the nut has proved to be entirely effective with nuts, the bodies of which are made of certain metals, but has proved to be not entirely effective with the nut bodies made of certain other metals, such for example as brass, aluminum and light aluminum-containing alloys.

I have discovered that an absolutely effective locking of a symmetrical washer-like insert in a nut of the kind under discussion can be effected without keying or the like and with complete reliability regardless of the metal employed when the insert is made of compressed or "vulcanized" fibre of the kind commercially employed in stop nuts of the type under consideration, or other like material, and is subjected to compression in a direction transverse to the axis of the bore, caused by deforming the side wall of the recess inwardly against the outer periphery or circumference of the insert after the latter has been inserted into the recess. I have further discovered that when this is done by forcing the side wall of the recess inwardly as well as over the top of the insert, certain other advantages are obtained which will hereinafter be more fully pointed out.

In order to illustrate the invention and to make more readily apparent the difference between the method and product of the present invention and the method and product of prior manufacture, I have illustrated in the drawing a typical example of stop nut embodying the invention and a like example of stop nut as heretofore made.

In the drawing:

Fig. 1 is a view, partially in cross-section of a nut body and insert before the two are secured together;

Fig. 2 is a cross-sectional view of a complete stop nut in accordance with the present invention;

Fig. 3 is a cross-sectional view of a tool for securing the insert within the nut body, and also shows the application of the tool to the work; and Fig. 4 is a cross-sectional view of a stop nut in accordance with the prior art.

Referring now more particularly to Fig. 1, reference numeral 10 indicates a nut body in blank form for a hexagonal nut having a hexagonal base portion 12 and a threaded bore 14 which at its upper end is counterbored to provide a recess 16. The counterbore is preferably made with a twist drill of ordinary form having the usual conically ground cutting edges which leave a conical surface 18 at the bottom of the recess.

The upper portion 20 of the nut blank is preferably circular exteriorly so that the wall 22 of the recess is of uniform thickness around the circumference of the recess, and is also advantageously tapered axially as shown.

The non-metallic insert is indicated at 24 and is in the form of an annular washer having a bore 26 smaller in diameter than the maximum diameter of the thread of a bolt or screw suitable for engaging the threads 28 in the bore 14.

The insert is most advantageously made of compressed fibre of known kind, the structure of which consists of a series of laminations 30 bonded together by pressure and suitable bonding material. Such compressed fibre is an ordinary commercial product and the details of its composition are unimportant.

In the manufacture of the nut from the parts shown in Fig. 1, the insert 24 is inserted into the recess 16 so that it seats against the bottom of the recess and the nut is then deformed so that the wall 22 is compressed radially inwardly against the outer peripheral surface 32 of the insert, the top of the wall 22 being bent or crimped over the top of the insert.

The appearance of the nut after locking the insert in place by deforming the wall 22 is as shown in Fig. 2, the wall 22 of the recess being bent inwardly and the top portion of the wall being crimped over the top of the insert to form a lip 22a.

As will be apparent from the figure, the lateral or radial pressure exerted by the wall 22 on the washer not only exerts a very strong pressure for preventing the turning of the insert in the recess but also tends to dish the insert in the manner indicated in somewhat exaggerated fashion in the drawing. This dishing of the insert increases the holding action of the nut on the bolt or screw in a manner which will be explained later.

In order to perform the deforming operation on the nut body, I prefer to employ a modification of the general method and apparatus disclosed in the aforesaid patent, in accordance with which a tool (Fig. 3) is employed having a pilot 34 with respect to which there is movably mounted a punch 36, the lower or working surface of which is conical in form, as indicated at 38.

In order to effect the desired locking of the washer in the recess, the nut blank with the insert in assembled position is placed on a suitable press bed under the punch and the pilot 34 inserted into the bore sufficiently to pass through the insert. Thereafter the punch is moved relative to the pilot so as to crimp the wall of the recess over the insert to the position shown in Fig. 2. The presence of the pilot in the bore of the insert during the crimping operation prevents the washer from being forced inwardly too far by the lateral pressure exerted thereon and during the crimping operation the bore of the insert is held to cylindrical form. Upon withdrawal of the pilot from the bore however, the insert, due to the elasticity of the material, assumes a form in which the bore is slightly tapering or conical.

Referring now to Fig. 4, a nut is shown with the insert fixed therein by means of axially exerted pressure in the manner heretofore employed. In accordance with previous practice, the outer circumference of the insert after the crimping operation is not subjected to any substantial or deforming lateral pressure from the side wall of the recess and the upper edge of the recess wall is bent down over the insert so as to exert a maximum of axial pressure on the insert, which pressure is depended upon to hold the insert against turning in the recess. When the insert is retained in the recess in this manner, the portion of the recess wall that is bent over the top of the washer tends to curl and "bite" into the top surface of the insert. This is due to the fact that when axial pressure is relied upon to lock the insert against turning, the amount of pressure applied to the bent over portion of the nut body must be so great as to tend to make it curl into the insert, since the insert is of relatively soft material. It has been found from experience that the inner corner or edge of the lip 22a acts to shear one or more of the top laminations of the fibre and when the nut is screwed onto a bolt, the threads of the bolt, forcing their way through the insert in accordance with the principle of operation of the nut, tend to and frequently do separate from the main body of the insert the portions of the sheared lamination or laminations that lie inside of the edge of the lip. This reduces the effectiveness of the insert by reducing the axial length of the insert which is in holding contact with the thread of the bolt and also reduces the strength of the locking of the insert in the recess. It is evident that the under side of the inturned lip of the nut body can transmit locking action to the main body of the insert only through the adhesion of the top lamination of the insert, with which the lip is in actual contact, to the laminations lying beneath it. Consequently if, due to the cutting action of the inner edge of the lip and the spreading action of the bolt thread, the inner part of the top lamination is severed from the remaining body of the insert, there remains for the purpose of maintaining adhesion only the comparatively small part of the top lamination lying under the lip. The shear stress set up between this remaining portion of the top lamination and first uncut lamination, due to the friction between the insert and the bolt being threaded through it, is in some instances sufficient to cause the top lamination or laminations of the insert to be sheared away from the remaining body of the insert. If this occurs, there is nothing to prevent the insert from turning in the recess and consequently the utility of the insert is destroyed.

If we now compare the structure just described with that shown in Fig. 2 and consider the action which takes place, it will be evident that the construction in accordance with the present invention wholly avoids the difficulties heretofore encountered with the earlier kind of construction.

Because of the fact that in the present construction, laterally exerted pressure is relied upon to hold the insert against turning in the recess, it is not necessary to exert so much downward pressure on the inturned lip as to cause this lip to bite into the top of the insert. Due to the fact that the insert is of compressible material, a certain amount of compression in axial direction does result, but the extent of the compression in axial direction may be considerably less than heretofore required and the insert may be effectively locked even though the bottom surface of the lip is not materially curled downwardly at its inner edge but is more or less plane. Consequently, the cutting of one or more of the top laminations of the insert may be avoided, but even if the lip should be curled over so as to bite into the top laminations, this does not produce the same undesirable results as in the previously known forms of construction. The reason for this is that even though one or more of the top laminations of the insert are cut by the inner edge of the lip and the portions of such laminations inside of the lip are parted from the main body of the insert by the action of the bolt, the loss of this part of the material of the insert can not seriously affect the holding action, since all of the various laminations of the insert are individually restrained against turning movement in the recess by the lateral pressure exerted by the side walls against the outer circumference of each of the laminations. In other words, with the present form of construction the locking of the insert against turning in the recess is not dependent upon the adhesion to each other of the several laminations of the material making up the insert.

This feature is of particular importance in the construction of nuts of large size. There are certain definite practical limits of thickness for laminated fibre of the kind which has been found most suitable for use in nuts of the kind under discussion and for large nuts the thickness of the insert is frequently greater than the maximum thickness of commercially practical laminated fibre products. Consequently for these nuts the insert is made up of a plurality of separate fibre washers superimposed within the recess. Heretofore these separate washers have had to be individually keyed or, where axially applied locking pressure has been used, reliance has had to be placed upon frictional contact between separate washers for preventing one or more of them from turning in the recess.

It will be evident that with the present form of construction each individual washer, in constructions where a plurality are used, is independently gripped by the laterally applied pressure of the deformed side wall of the recess, so that positive locking of all of the washers is obtained.

As heretofore mentioned, the deforming of the recess side wall in the manner contemplated by the present invention deforms the insert to a dished shape. This dished shape of the insert substantially increases the holding action.

The holding action of nuts of the kind under consideration is substantially based on the following principle. When the nut is threaded on a bolt or screw, the threads of the bolt are forced through the unthreaded insert by the portion of the thread of the bolt which is in engagement with the threaded portion of the nut bore. It will be evident that when the bolt thread is forced through the insert the displacement of the material of the insert by the thread will produce a frictional contact between the insert and the portion of the thread within the insert which is of material value in preventing the nut from turning on the bolt. In addition to this however, and even more important in preventing the nut from turning on the bolt, is the constantly maintained frictional contact between one flank of the bolt thread and the corresponding flank of the threaded portion of the nut body. This constant frictional contact is maintained by the axial force or thrust exerted by the insert on the bolt which is forced through it. It is evident that the insert will resist the threading through it of the bolt and the displacement of the material of the insert is such that a reaction is produced in the form of an end thrust. When the insert is cylindrical in form, the bolt tends to push the center of the insert upwardly out of the nut or in other words tends to dish the center outwardly. In the present form of construction, the bolt tends to force the center of the insert outwardly but because of the dished character of the insert, this action automatically tends to cause the internal diameter of the insert to decrease and also tends to cause the insert to exert an even stronger axial thrust on the bolt as the insert tries to return to its dished form.

It will therefore be seen that a stop nut in accordance with my invention is not only more certain in its holding action, but also exerts a greater locking force than stop nuts known to the prior art.

While I have shown and described one more or less specific embodiment of my invention, it is to be understood that this has been done for purposes of illustration only, and constitutes no limitation of the scope thereof, which is to be determined by the appended claims.

I claim:

1. A nut structure comprising a nut body having a threaded bore provided with a circular recess at one end of the bore and an annular transversely laminated locking insert permanently secured in said recess, said insert being restrained against turning in said recess by lateral pressure continuously exerted by the side wall of said recess independently of engagement of any member with the bore of the insert.

2. A nut structure comprising a nut body having a threaded bore provided with a recess at one end of the bore, said recess tapering inwardly in the direction away from the threaded portion of the bore and a locking insert of elastic material situated in said recess and subjected to lateral pressure exerted thereon by the tapering wall of the recess.

3. A nut structure comprising a nut body having a threaded bore with a circular recess at one end of the bore, an annular transversely laminated fibre insert permanently secured in said recess, the wall of the recess being conically tapered inwardly in the direction away from said threaded bore and continuously exerting radially inwardly directed pressure on said insert independently of engagement of any member with the bore of the insert.

4. A nut structure comprising a nut body having a threaded bore provided with a conically bottomed recess at one end of the bore and an annular elastic non-metallic locking insert situated in said recess, the side wall of the recess being tapered to dish the insert toward said bore to maintain one end surface thereof substantially in contact with the conical bottom of the recess and to effect an inward tapering of the bore of the washer in the direction away from said threaded bore.

5. The improved method of manufacturing elastic stop nuts which consists in providing a nut body having a threaded bore and an open cylindrical recess at one end of the bore, inserting an annular cylindrical elastic locking insert in said recess, inserting a substantially incompressible supporting member in the bore of said insert to prevent the collapse thereof during subsequent operation, deforming the side wall of said cylindrical recess to conical tapered form and turning the free end of the wall of said recess inwardly over the insert while said supporting member is in the bore of the insert and thereafter withdrawing said supporting member.

6. That improvement in the manufacture of stop nuts which consists in providing a nut body having a threaded bore with an open recess at one end of the bore, inserting an annular locking insert of elastic non-metallic material, and frictionally locking said insert against rotation in said recess by subjecting the insert to radial compression between the wall of the recess and a supporting member inserted in the bore of the insert, said compression being effected by deforming the cylindrical wall of the recess inwardly to tapered form.

7. A nut structure comprising a nut body having a circular locking insert of elastic material permanently secured within a circular recess in the nut body, the side wall of the recess being in lateral force transmitting contact with the outer periphery of said insert.

8. A nut structure comprising a nut body having a threaded bore provided with a recess at one end of the bore, said recess tapering inwardly in the direction away from the threaded portion of the bore, and a locking insert comprising a plurality of annular washers of elastic material situated in said recess, each of said washers being individually subjected to lateral pressure exerted thereon by the tapering wall of the recess.

9. In the manufacture of a lock nut of the kind having a circular elastic locking insert retained in a recess within the nut body, that improvement which consists in deforming the wall of the recess inwardly around the outer periphery of the insert to constrain the insert against rotation relative to the nut body by lateral pressure exerted by the wall of the recess on the peripheral wall of the insert.

10. The improved method of manufacturing lock nuts which consists in providing a nut body having a threaded bore with an open cylindrical recess at one end of the bore, providing a locking insert by inserting one or more annular cylindrical washers of elastic material in said recess and deforming the side wall of the recess to taper the wall thereof inwardly in the direction away from the threaded portion of the bore to exert lateral pressure against the outer periphery of said insert and to thereby constrain the same against turning relative to the nut body.

CARL A. SWANSTROM.